US007487096B1

(12) United States Patent
Cox et al.

(10) Patent No.: US 7,487,096 B1
(45) Date of Patent: Feb. 3, 2009

(54) METHOD TO AUTOMATICALLY ENABLE CLOSED CAPTIONING WHEN A SPEAKER HAS A HEAVY ACCENT

(75) Inventors: Susan M. Cox, Rochester, MN (US); Janani Janakiraman, Austin, TX (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/034,206

(22) Filed: Feb. 20, 2008

(51) Int. Cl.
*G10L 11/00* (2006.01)
*H04N 7/00* (2006.01)

(52) U.S. Cl. ........................ 704/277; 704/270; 348/468

(58) Field of Classification Search ................. 704/270, 704/277; 348/14.08, 14.09, 486; 370/260
See application file for complete search history.

(56) References Cited

U.S. PATENT DOCUMENTS

| | | | | |
|---|---|---|---|---|
| 6,393,389 | B1 * | 5/2002 | Chanod et al. | 704/7 |
| 7,130,790 | B1 * | 10/2006 | Flanagan et al. | 704/2 |
| 7,149,690 | B2 * | 12/2006 | August et al. | 704/270 |
| 2005/0038661 | A1 * | 2/2005 | Momosaki et al. | 704/275 |
| 2005/0162551 | A1 * | 7/2005 | Baker | 348/468 |
| 2007/0143103 | A1 | 6/2007 | Asthana et al. | |

OTHER PUBLICATIONS

An automatic caption-superimposing system with a new continuous speech recognizer;Imai, T.; Ando, A.; Miyasaka, E.;Broadcasting, IEEE Transactions on vol. 40, Issue 3, Sept. 1994 pp. 184-189.*

Robust speech detection and segmentation for real-time ASR applications Shafran, I.; Rose, R.; Acoustics, Speech, and Signal Processing, 2003. Proceedings. (ICASSP '03). 2003 IEEE International Conference on Vol. 1, Apr. 6-10 2003 pp. I-432—I-435 vol. 1.*

Trym Holter, Erik Harborg, Magne Hallstein Johnsen, Torbjörn Svendsen; ASR-Based Subtitling of Live TV-Programs for the Hearing Impaired;Sixth International Conference on Spoken Language Processing (ICSLP 2000) Beijing, China Oct. 16-20, 2000;pp. 1-4.*

On-line Captioning of TV-Programs for the Hearing Impaired Erik Harborg, Trym Holter, Magne Hallstein Johnsen, Torbjon Svendsen Sixth European Conference on Speech Communication and Technology On-line Captioning of TV-Programs for the Hearing Impaired;(EUROSPEECH'99), Budapest, Hungary,Sep. 5-9, 1999;pp. 1-4.*

A Statistical Approach to Automatic Speech Summarization; Hori,Furui,Malkin,Yu,Wailbel; EURASIP Journal on Applied Signal Processing 2003:2, 128-139.*

* cited by examiner

*Primary Examiner*—Michael N Opsasnick
(74) *Attorney, Agent, or Firm*—Cantor Colburn LLP; Libby Handelsman

(57) ABSTRACT

A method for automatically enabling closed captioning in video conferencing when a heavy accent is detected from a current speaker is provided. Language background and/or ethnicity information is received as a user preference. An acceptable accent level is determined according to the user preference. An audio signal of a speaker speaking in a language is received. A pronunciation of the speaker in the audio signal is compared with standard pronunciation for the language. An accent level of the speaker is determined, and the accent level of the speaker is compared to the acceptable accent level. If the comparison determines that the accent level of the speaker does not comply with the acceptable accent level, closed captioning in enabled for the audio signal. If the comparison determines that the accent level of the speaker complies with the acceptable accent level, closed captioning is not enabled for the audio signal.

4 Claims, 4 Drawing Sheets

Receive language background information or ethnicity information as a user preference 300

Determine an acceptable accent level according to the user preference 310

Receive an audio signal of a speaker speaking in a language 320

Compare pronunciation of the speaker in the audio signal with standard pronunciation for the language 330

Determine an accent level of the speaker in the language 340

Compare the accent level of the speaker to the acceptable accent level of the user preference 350

If the accent level of the speaker does not match the acceptable accent level, closed captioning is enabled 360

If the accent level of the speaker matches the acceptable accent level, closed captioning is not enabled 370

400
Processor 410
Input/Output Devices 470
Memory 420
Source Code 430
Compiler 440
Operating System 450
Application 460

METHOD TO AUTOMATICALLY ENABLE CLOSED CAPTIONING WHEN A SPEAKER HAS A HEAVY ACCENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

Exemplary embodiments relate to speech recognition technology, and more particularly to automatically enabling closed captioning when accents are detected.

2. Description of Background

With today's advanced technology, communicating across the globe with people who speak different languages is already part of our lives. Sometimes, when people need to conduct conference calls across different countries, they need to communicate through one language (e.g., English) if simultaneous interpreter service is not provided.

However, since people may have different accents when their native language is not English, it could be difficult to understand each other sometimes. Prior art techniques to solve this problem include converting speech to an accent of choice.

A method to address issues when a speaker is communicating with an accent would be beneficial.

SUMMARY OF EXEMPLARY EMBODIMENTS

In accordance with exemplary embodiments, a method is provided for automatically enabling closed captioning in video conferencing when a heavy accent is detected from a current speaker. Language background information and/or ethnicity information is received as a user preference. An acceptable accent level is determined according to the user preference. The acceptable accent level includes at least one of none, low, medium, and heavy. An audio signal of a speaker speaking in a language is received. A pronunciation of the speaker in the audio signal is compared with standard pronunciation for the language. An accent level of the speaker is determined in the language. The accent level of the speaker includes at least one of none, low, medium, and heavy. The accent level of the speaker is compared to the acceptable accent level corresponding to the user preference. If the comparison determines that the accent level of the speaker does not comply with the acceptable accent level, closed captioning is enabled for the audio signal. If the comparison determines that the accent level of the speaker complies with the acceptable accent level, closed captioning is not enabled for the audio signal.

Additional features and advantages are realized through the techniques of the present invention. Exemplary embodiments of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features of exemplary embodiments are apparent from the following detailed description taken in conjunction with the accompanying drawings in which:

Figure 1:
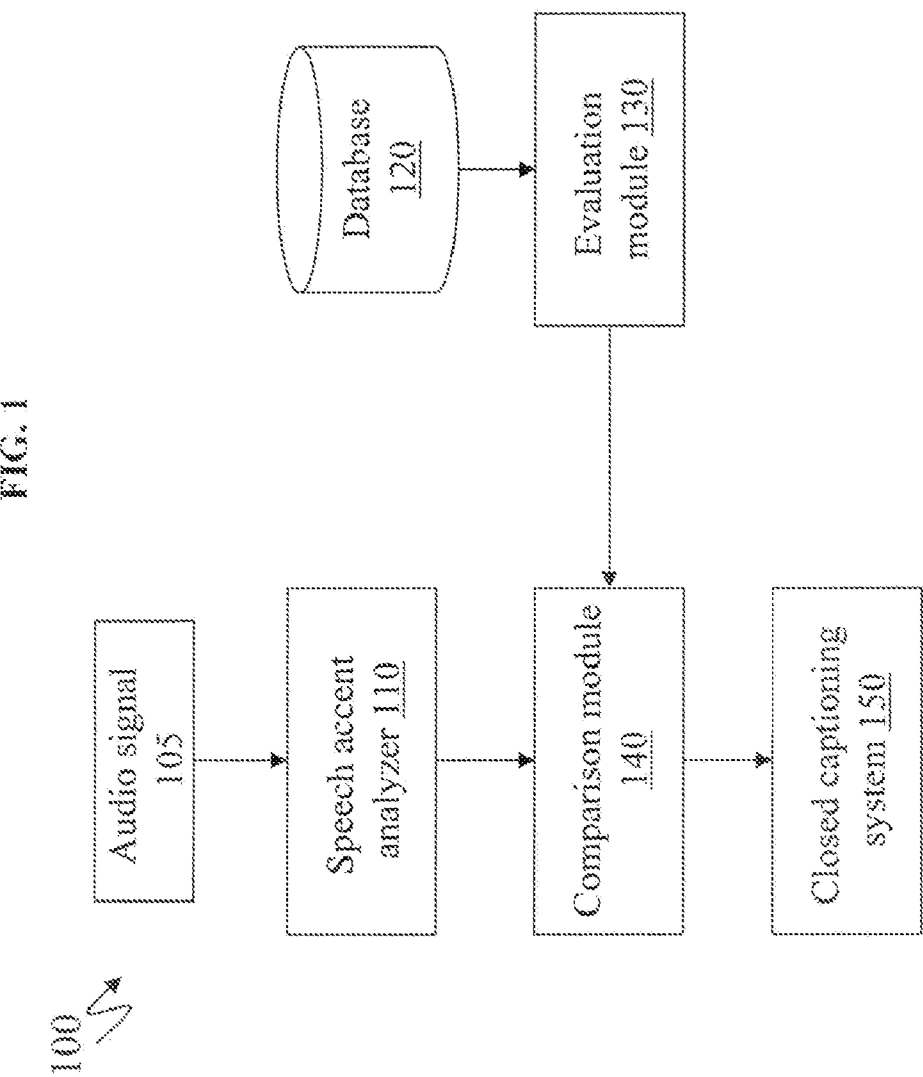
FIG. 1 illustrates a block diagram of a system for automatically enabling closed captioning when a speaker speaks with a heavy accent in accordance with exemplary embodiments.

The detailed description explains exemplary embodiments, together with advantages and features, by way of example with reference to the drawings.

DETAILED DESCRIPTION OF EXEMPLARY EMBODIMENTS

Exemplary embodiments provide a method to automatically enable closed captioning in, e.g., video conferencing when a heavy accent is detected from the current speaker.

Closed captioning is a well-known method to help in understanding audio, e.g., to aid the hearing impaired or during noisy conditions. For example, a technique exists for turning on closed captioning when the background noise is above a given threshold.

Exemplary embodiments, however, provide the ability to turn on closed captioning when the audio is clear but the speech may be difficult for the listener to understand because the speech is heavily accented. Implementations for exemplary embodiments may utilize existing speech recognition technology to help people understand each other better during, e.g., video conferencing. When a video conference is started, meeting attendees can see the presenter through the screen. Even though Meeting attendees may view the video conference from their own individual systems (e.g., laptop computers), or the meeting attendees may view the video conference as a group using shared hardware. At the beginning of the meeting, the meeting attendees can choose to enter their ethnicity or language background information in the video conferencing tool if viewing on their own individual systems. If viewing the video conference as a group on shared hardware, ethnicity or language background information of the group can be entered. This ethnicity or language background information will be referred to as a "user preference", although it is understood the "user" may refer to a group of meeting attendees rather than an individual.

When the speaker starts to present, the speech recognition tool may compare the speaker's tone with standard pronunciation of that language, determining the accent "level" of the speaker. This accent level may be one of two simple choices: heavy or none. Also, the accent level may be one of many graded choices such as very heavy, heavy, moderate, light, or none. The accent levels may also denote the ethnicity of the accent (e.g., heavy German accent). The accent levels can also be denoted by numerals, which increase flexibility or the ability to tie in with any existing speech standards. The manner in which accent levels can be defined is not meant to be limiting.

Exemplary embodiments, e.g., using a speech recognition tool, may compare the user preferences with the determined accent level on a per display basis. For individual meeting attendees using their own hardware systems, this comparison may be based on individual user preferences. For shared hardware settings, this comparison may be based on either consensus within the group, the individual who owns the hardware, or by some other means (e.g., defaults).

If the user preferences do not match the speaker's language and determined accent level, then closed captioning will be enabled on that user display automatically. If a match exists, closed captioning will not be enabled. In any case, the capability of overriding the automatic closed captioning tool and either forcing closed captioning on or forcing it off is allowed.

Now turning to the figures, FIG. 1 illustrated a block diagram of a system 100 for automatically enabling closed captioning when a speaker speaks with a heavy accent, in accordance with exemplary embodiments. The system 100 may be considered as an automatic closed captioning tool. The system 100 may be implemented on a device capable of conducting conferences, such as a computer 400 in FIG. 4.

The system 100 may include a speech accent analyzer 110 for analyzing and determining the accent of a speaker. The speech accent analyzer 110 may receive an audio signal 105, e.g., during a video conference having both audio and video parts. The speech accent analyzer 110 may analyze the pronunciation of speech by the speaker of the audio signal 105. The speech analyzer 110 may determine the type of accent (e.g., Spanish) and the level of the accent (such as what degree). The accent level, e.g., may range from none to very heavy, or the accent level may range from 0 (none) to 10 (being the highest accent level). Also, the speech accent analyzer 110 can estimate/determine the type of accent (e.g., Spanish) of the speech being spoken in the audio signal 105.

As discussed herein, user preferences may be input (e.g., using a keyboard, mouse, touch screen, microphone, etc.) in a computing device (such as the computer 400) and stored in a database 120. The user preferences may include ethnicity information, language background information, and/or an acceptable accent level.

The evaluation module 130 may receive (extract) user preferences (from the database 120) for a user and determine an acceptable accent level (in a profile) for the user, if an acceptable accent level is not input. Also, the evaluation module 130 may determine that, e.g., the user can have a heavy (or the highest) accent level in Chinese because the user preferences indicate that the user is Chinese. Similarly, the evaluation module 130 may determine that in all other languages the acceptable accent level is moderate. Based on the user preferences from the database 120, the evaluation module 130 can generate a profile of many acceptable accent levels for a user (or group of users). For example, the profile generated by the evaluation module 130 may include a heavy acceptable accent level in three particular languages but may include different acceptable accent levels in any other languages. The profile generated by the evaluation module 130 is based on input user preferences stored in the database 120, and the profile can be very detailed with varied options.

A comparison module 140 compares the accent level from the speech accent analyzer 110 to the acceptable accent level of the profile generated in the evaluation module 130. The comparison module 140 determines if the accent level of the speech, e.g., in the audio signal 105 matches the acceptable accent level of the user. The comparison module 140 determines, e.g., whether the accent level is equal to (or matches) the acceptable accent level, whether the accent level is less than the acceptable accent level, and/or whether the accent level is greater than the acceptable accent level. If the accent level of the speaker (e.g., heavy accent level) is greater than the acceptable accent level (e.g., moderate acceptable accent level), a closed captioning system 150 is enabled. If an accent level (e.g., moderate accent level) is equal to or less than the acceptable accent level (e.g., moderate acceptable accent level), the closed captioning system 150 is not enabled. The closed captioning system 150 may operate as any well-known closed captioning system as understood in the art. Also, the closed captioning system 150 may include various speech recognition tools and techniques for providing text messages that correspond to the speech spoken by the speaker. Indeed, the closed captioning system 150 is not meant to be limiting.

Figure 2:
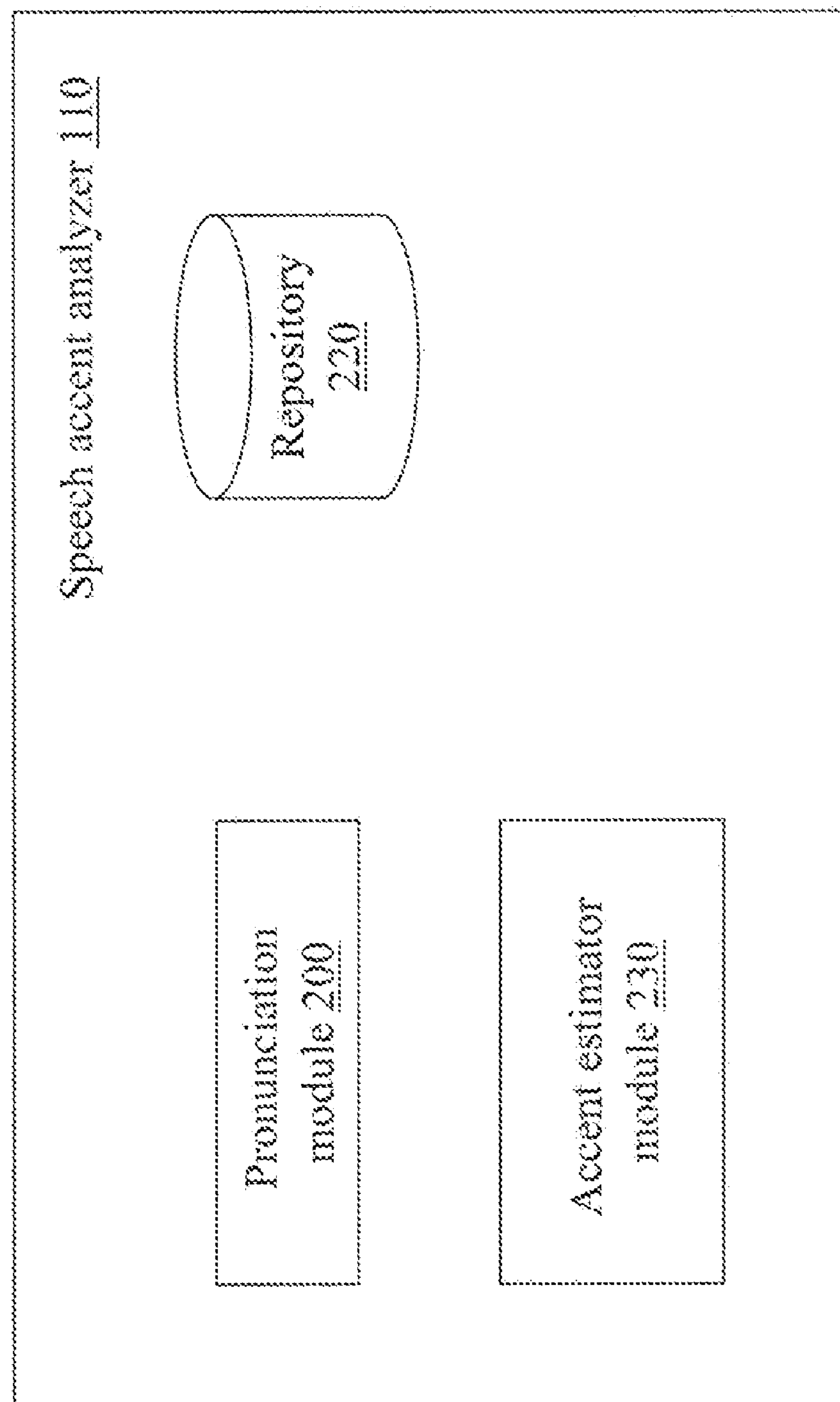
FIG. 2 further illustrates an implementation of the speech accent analyzer in accordance with exemplary embodiments.

FIG. 2 further illustrates an implementation of the speech accent analyzer 110 in accordance with exemplary embodiments. The speech accent analyzer 110 may include a pronunciation module 200 that analyzes the pronunciation of speech spoken in a particular language, such as English being spoken by the speaker in the audio signal 105. It is understood that the pronunciation module 200 is capable of analyzing other languages, too. The pronunciation module 200 may also utilize traditional speech recognition tools and/or models (such as the hidden Markov model) for analyzing the speech of the audio signal 105.

The pronunciation module 200 may analyze the speech spoken in the audio signal 105 to determine if the speaker speaks with an accent (or a dialect). The speech accent analyzer 110 may include or be coupled to a repository 220. The pronunciation module 200 may compare the speech of the audio signal 105 to standard pronunciation of English (or any language being analyzed) stored in the repository 220.

The pronunciation module 200 may analyze the articulation and/or stress patterns of syllables, words, sub-words, vowels, paragraphs, etc. spoken by the speaker in the audio signal 105. For example, the pronunciation module 200 is able to determine how vowels or consonants are pronounced in the audio signal 105. The pronunciation module 200 may determine that certain vowels (or diphthongs) are not pronounced according to standard English. From analyzing the speech of the audio signal 105 and from comparing the speech of the audio signal 105 to the standard pronunciation of English (e.g., samples or modules) in the repository, the pronunciation module 200 can determine that the speech of the audio signal 105 is spoken with an accent. That is, the speech is not spoken in accordance with standard English pronunciation.

The accent estimator module 230 (or the pronunciation module 200) can determine to what degree that the speech spoken in the audio signal 105 is out of line with standard English pronunciation. The accent estimator module 230 can determine, e.g., that the speaker in the audio signal 105 speaks with a very heavy accent, a heavy accent, a medium accent, a light accent, and/or no accent.

Also, the accent estimator module 230 may estimate/determine the type of accent that the speaker speaks with. For example, the accent estimator 230 can determine if the speaker speaks English with, e.g., a British or Spanish accent. After speech recognition, the accent estimator module 230 can compare the audio signal (or segments of the audio signal) 105 to corresponding English pronunciations in the repository 220. The accent estimator 230 in conjunction with the pronunciation module 200 can determine that the speech in the audio signal 105 is closest to speech spoken by a person with a particular accent. The repository 220 may contain speech of, e.g., English syllables, vowels, consonants, words, phrases, etc. spoken by speakers of having many different native languages, having varying accents (or combinations), and having varying levels of accents. For example, in the repository 220, the accent for many Spanish speakers can be stored and categorized by the level accent (e.g., from none to very heavy). The accent estimator module 230 can create similar or exact phrases of speech from the repository 220 to correspond with the speech in the audio signal 105, so that the speech can be compared. Using the pronunciation module 200 and the accent estimator module 230, the speech accent analyzer 110 can determine the level of accent and what type of accent is spoken by the speaker in the audio signal 105.

Figure 3:
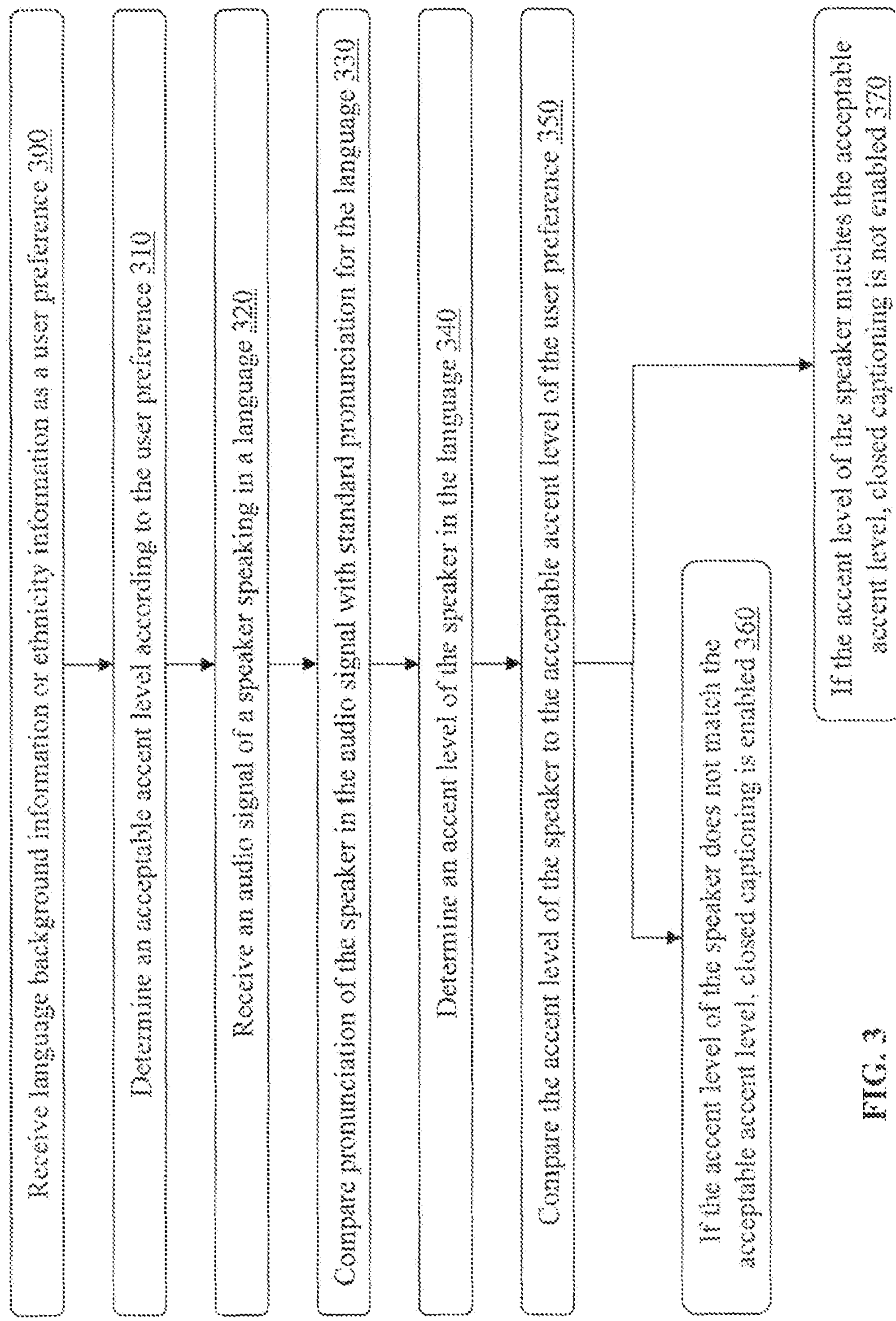
FIG. 3 illustrates a method for automatically enabling closed captioning in accordance with exemplary embodiments.

FIG. 3 illustrates a method for automatically enabling closed captioning in video conferencing when a heavy accent is detected from a current speaker in accordance with exemplary embodiments.

Language background information and/or ethnicity information for a user(s) is received as a user preference at 300. The language background and ethnicity information are stored in the database 120. The language background and ethnicity information may be input in a computer by the user, such as the computer 400 discussed below. An acceptable accent level for the user(s) is determined (e.g., by the evaluation module 130) according to the user preference at 310. Also, the acceptable accent level may be set in advance by the user. As a non-limiting example, the acceptable accent level of the user may be categorized as at least one of none, low, medium, and heavy. The exact delineations for the categorizes none, low, medium, and heavy may vary according to the needs of a given application. The category none may correspond with having no accent at all (e.g., unnoticeable) or very little accent. It is understood that low may denote the lowest category of an accent level and heavy may denote the highest category of an accent level, while medium may denote an accent level that is midway. Further, the acceptable accent level may be categorized using the numbers 1-10, where 1 is the lowest acceptable accent level and 10 is the maximum acceptable accent level. Moreover, these categories of acceptable accent levels are provided for illustrative purposes and are not meant to be limiting.

The audio signal 105 of a speaker speaking in a language is received by the speech accent analyzer 110 at 320. Pronunciation of the speaker in the audio signal 105 is compared with standard pronunciation for the language by the speech accent analyzer 110 at 330. An accent level of the speaker in the language is determined by the speech accent analyzer 110 at 340. The speech accent analyzer 110 may incorporate various known speech recognition tools when analyzing the speech in the audio signal 105. As a non-limiting example, the accent level of the speaker may be at least one of none, low, medium, and heavy.

The accent level of the speaker is compared to the acceptable accent level of the user preference by the comparison module 140 at 350. If the accent level of the speaker does not match the acceptable accent level, closed captioning (e.g., the closed captioning system 150) is enabled at 360. For example, the acceptable accent level may be low and the accent level of the speaker may be high, and in such a case, the closed captioning system 150 is enabled. If the accent level of the speaker matches the acceptable accent level, closed captioning (e.g., the closed captioning system 150) is not enabled at 370. For example, the acceptable accent level may be low and the accent level of the speaker may be none, and in such a case, the closed captioning system 150 is not enabled because the accent level of the speaker is lower than the acceptable accent level for the user.

Also, in exemplary embodiments, the acceptable accent level may include a plurality of acceptable accent levels in which each accent level corresponds to different languages. For example, a person may be fluent in four different languages and can clearly understand English if spoken by a speaker with a heavy accent in any of the four languages. Therefore, the evaluation module 130 may generate a profile that allows a heavy accent if spoken by a speaker in any of the four different languages, but only allow a moderate accent level if spoken by a speaker whose accent is not in one of the four different languages. The comparison module 140 would compare the profile of the person (which includes a heavy accent for the four different languages) to the accent level of the speaker determined in the speech accent analyzer 110. If the speech accent analyzer 110 determines that the speaker speaks (English) with an accent from any of the four languages, the comparison module 140 would allow a heavy accent and would not enable the closed captioning system 150. However, if (the speech accent analyzer 110 determines that) the accent level was a heavy accent in a language other than the four languages, the comparison module 140 determines that the acceptable accent level of the user preferences does not match the accent level of the speaker. The comparison module 140 would automatically enable the closed captioning system 150. In accordance with exemplary embodiments, the acceptable accent level may include a general acceptable accent level for all languages regardless of what type of accent (e.g., Spanish) the speaker speaks with. Also, the acceptable accent level may specify certain accents that can have a higher or lower acceptable accent level if the speaker speaks with that particular accent.

As a non-limiting example, at an international conference held in Beijing, a speaker who is Chinese but presenting in English will probably have an accent easily understood by audience members who are also Chinese (which is input in user preferences). By comparing (using the comparison module 140) the user preferences of these audience members with the speaker's language (English) and the determined accent level (heavy Chinese) by the speech accent analyzer 110, the system 100 may conclude that closed captioning (e.g., the closed captioning system 150) is not needed for these individuals. In this case, the user preferences stored in the database 120 would include both Chinese and English as acceptable languages or ethnicity.

However, in comparing the user preferences for audience members who choose non-Chinese ethnicity or language background options, the system 100 may conclude closed captioning is needed and enable closed captioning on their displays.

Further, in accordance with exemplary embodiments, the user preference may correspond to a group of users. The evaluation module 130 can determine the acceptable accent level for the group of users. As a non-limiting example, each user in the group may input language background information and/or ethnicity information, which can be stored in the database 120. The evaluation module 130 can determine the acceptable accent level based on the data input by each of the users.

For example, the evaluation module 130 may determine the acceptable accent level based on information input by the majority (or an average) of the group. The evaluation module 130 may determine that a heavy acceptable accent level is needed for the group, even though some users may desire a lower level for the acceptable accent level (such as moderate acceptable accent level) based on their input.

Also, the evaluation module 130 may determine the acceptable accent level based on the minimum acceptable accent level for any single person. Even though some users may understand a heavy accent, the evaluation module 130 may determine that a moderate acceptable accent level is needed for the group.

In accordance with exemplary embodiments, it is understood by those skilled in the art that the evaluation module 130 may use various techniques (e.g., a weighted process) for determining the acceptable accent level for a group of users or an individual user, and the illustrations disused herein are not meant to be limiting.

Moreover, the methodology and techniques provided in the disclosure enable people from different language backgrounds to communicate more easily. Also, in accordance with exemplary embodiments, the various elements (e.g., such as modules, applications, systems, etc.) discussed herein may be integrated or separated in accordance with a given purpose.

Figure 4:
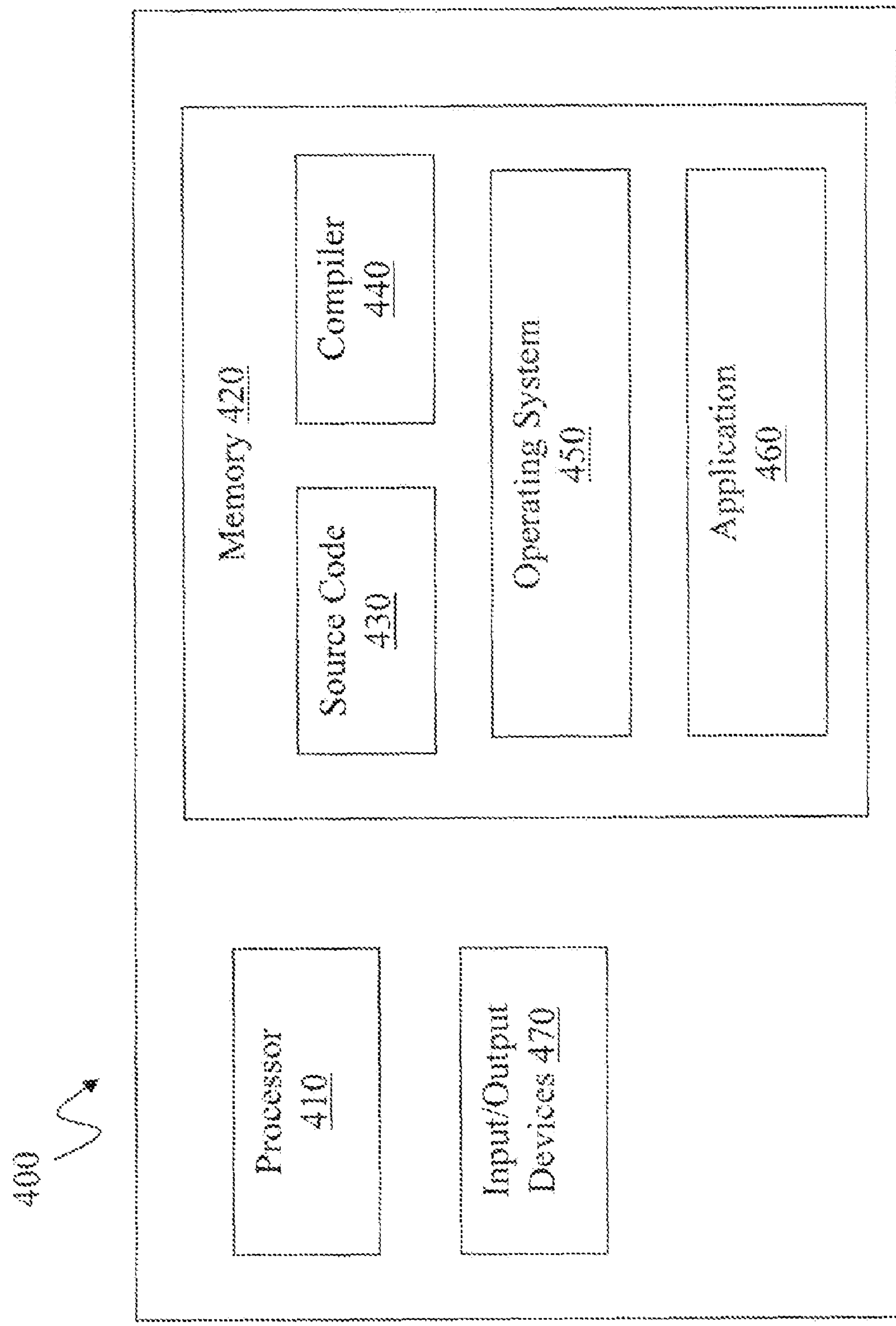
FIG. 4 illustrates a non-limiting example of a computer having capabilities, which may be included in exemplary embodiments.

FIG. 4 illustrates an example of a computer 400 having capabilities, which may be included in exemplary embodiments. Various operations discussed above may also utilize the capabilities of the computer 400. One or more of the capabilities of the computer 400 may be incorporated in any element, module, or component discussed herein.

The computer 400 includes, but is not limited to, PCs, workstations, laptops, PDAs, palm devices, servers, and the like. Generally, in terms of hardware architecture, the computer 400 may include one or more processors 410, memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a data signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and an application 460 (which may be one or more applications) of the exemplary embodiments. As illustrated, the application 460 comprises numerous functional components for implementing the features and operations of the exemplary embodiments. The application 460 of the computer 400 may represent various applications, computational units, logic, functional units, processes, operations, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

The application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as (a) an object oriented programming language, which has classes of data and methods, or (b) a procedure programming language, which has routines, subroutines, and/or functions, for example but not limited to, C, C+ +, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 400 includes non-limiting examples of software and hardware components that may be included in various devices and systems discussed herein, and it is understood that additional software and hardware components may be included in the various devices, modules, and systems discussed in exemplary embodiments.

The capabilities of the present invention can be implemented in software, firmware, hardware or some combination thereof.

As one example, one or more features of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for automatically enabling closed captioning in video conferencing when a heavy accent is detected from a current speaker, comprising:

receiving language background information or ethnicity information as a user preference;

determining an acceptable accent level according to the user preference, wherein the acceptable accent level comprises at least one of none, low, medium, and heavy;

receiving an audio signal of a speaker speaking in a language;

comparing a pronunciation of the speaker in the audio signal to standard pronunciation for the language;

determining an accent level of the speaker in the language, wherein the accent level of the speaker comprises at least one of none, low, medium, and heavy;

comparing the accent level of the speaker to the acceptable accent level corresponding to the user preference, wherein:

if the comparison determines that the accent level of the speaker does not comply with the acceptable accent level, closed captioning is enabled for the audio signal; and if the comparison determines that the accent level of the speaker complies with the acceptable accent level, closed captioning is not enabled for the audio signal.

2. The method of claim 1, wherein the acceptable accent level can be set in advance by a user.

3. The method of claim 1, wherein the acceptable accent level comprises a plurality of acceptable accent levels corresponding to a plurality of different languages.

4. The method of claim 1, wherein the user preference corresponds to a plurality of users.

* * * * *